(12) United States Patent
Iwamura et al.

(10) Patent No.: US 8,364,151 B2
(45) Date of Patent: Jan. 29, 2013

(54) USER APPARATUS AND PAGING CHANNEL RECEPTION METHOD

(75) Inventors: Mikio Iwamura, Yokohama (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 63 days.

(21) Appl. No.: 12/679,405

(22) PCT Filed: Sep. 17, 2008

(86) PCT No.: PCT/JP2008/066746
§ 371 (c)(1),
(2), (4) Date: Jun. 9, 2010

(87) PCT Pub. No.: WO2009/041328
PCT Pub. Date: Apr. 2, 2009

(65) Prior Publication Data
US 2010/0297999 A1    Nov. 25, 2010

(30) Foreign Application Priority Data
Sep. 28, 2007   (JP) .................................. 2007-255743

(51) Int. Cl.
*H04W 36/00* (2009.01)
(52) U.S. Cl. ..... 455/440; 455/450; 455/455; 455/456.3; 370/329; 370/310; 370/341; 370/320
(58) Field of Classification Search .................. 455/440, 455/455, 456.3; 370/310, 341, 320, 329
See application file for complete search history.

(56) References Cited

U.S. PATENT DOCUMENTS

| | | | |
|---|---|---|---|
| 2007/0218905 A1* | 9/2007 | Lee | 455/436 |
| 2007/0259675 A1* | 11/2007 | Worrall | 455/458 |
| 2008/0194264 A1* | 8/2008 | Eckert et al. | 455/445 |

FOREIGN PATENT DOCUMENTS

| | | |
|---|---|---|
| CN | 1635816 A | 7/2005 |
| JP | 2007-251586 A | 9/2007 |

OTHER PUBLICATIONS

International Search Report w/translation from PCT/JP2008/066746 dated Nov. 11, 2008 (2 pages).
Written Opinion from PCT/JP2008/066746 dated Nov. 11, 2008 (3 pages).
3GPP TSG RAN WG3 Meeting #53 bis, R3-061531; "UE-reporting based network-assigned Tracking Areas"; NEC; Seoul, Korea, Oct. 19013, 2006 (6 pages).
3GPP TS 36.300 V8.1.0; "Evolved Universal Terrestrial Radio Access (E-UTRA) and Evolved Universal Terrestrial Radio Access Network (E-UTRAN); Overall description"; Jun. 2006 (106 pages).

(Continued)

*Primary Examiner* — Wayne Cai
*Assistant Examiner* — Chuck Huynh
(74) *Attorney, Agent, or Firm* — Osha Liang LLP (57) ABSTRACT

A user apparatus which performs, when there is a change in a cell visited, a re-selection of a cell to camp on is disclosed. The user apparatus includes a tracking area ID determining unit which determines whether a new ID of a tracking area that is transmitted from one or more base station apparatuses matches a tracking area ID of a cell visited immediately before the cell re-selection; and a paging reception unit which conducts a paging reception using a paging parameter in the cell visited immediately before the cell re-selection when it is determined that the new ID of the tracking area matches the tracking area ID of the cell visited immediately before the cell re-selection.

3 Claims, 4 Drawing Sheets

OTHER PUBLICATIONS

Chinese Office Action for Application No. 200880117391.8, mailed on Jul. 4, 2012 (11 pages).

esp@cenet Patent Abstract for Chinese Publication No. 1635816, publication date Jul. 6, 2005. (1 page).

* cited by examiner

USER APPARATUS AND PAGING CHANNEL RECEPTION METHOD

BACKGROUND OF THE INVENTION

1. Field of the Invention

The present invention generally relates to radio communications systems and particularly relates to user apparatuses and paging channel reception methods.

2. Description of the Related Art

In a radio communications network, a location of user apparatuses is stored in a network in units of tracking areas. The tracking area, which corresponds to a location area (LA) or a routing area (RA) in 3G, includes one or more cells.

An access gateway apparatus which manages each of the user apparatuses has an identifier of the access gateway apparatus held in a home location register (HLR).

A user apparatus has two types of operating modes, i.e., an active mode and an idle mode.

A user apparatus in the idle mode or a user apparatus in a camping status selects a cell to camp on according to a propagation state, and receives a paging channel transmitted from the cell. The user apparatus checks for the paging channel received, checks for the presence of a signal indicating transmission incoming to the own apparatus and, upon determining that there is a signal indicating the transmission incoming to the own apparatus, accesses, in uplink, the cell it visits. Then, the user apparatus establishes a connection with the cell and changes to the active mode. At this time, the network is able to specify a cell visited by the user apparatus.

When the user apparatus is in the idle mode, there is no connection established with the user apparatus, so the network is not able to specify the cell visited by the user apparatus. Thus, the network transmits a paging channel at all cells belonging to the tracking area.

In each of the tracking areas, an identifier of the tracking area is reported from the corresponding cells. The user apparatus in the idle mode receives the reported identifier of the tracking area, so that it may determine the tracking area the own apparatus visits.

For example, when the identifier of the tracking area that is reported at a neighboring cell to which the user apparatus moves is different from a previously-reported identifier of the tracking area, the user apparatus accesses in uplink and requests for updating location registration. Such an updating of the location registration is called a tracking area update (TAU). More specifically, the user apparatus stores and holds an identifier of the tracking area to which location registration is made. The user apparatus performs a re-selection of a cell in conjunction with the move. Such a re-selection of the cell is called a cell re-selection. Each time a mobile station performs the cell re-selection, it receives broadcast information from the cell, and checks for an identifier of the tracking area included in the broadcast information. When an identifier of a new tracking area that is received is different from an identifier of a tracking area that is stored and held, it is determined that a tracking area previously visited has been exited, so that a tracking area update is performed. When the tracking area update is performed, the network reports, to the user apparatus, an identifier of a tracking area which has the user apparatus registered, and the user stores and holds the reported tracking area identifier. Then, the network may report an identifier for multiple tracking areas. In this case, the user apparatus performs the location registration of the multiple tracking areas at the same time. This is called a multi-TA registration. The user apparatus compares the tracking area identifier stored and held with the identifier of the tracking area reported at the cell re-selected in the cell re-selection so as to determine whether the tracking area update is needed.

On the other hand, if the identifier of the new tracking area that is received is the same as the stored and held tracking area identifier, the user apparatus determines that it has not exited the tracking area it has previously visited. In this case, the user apparatus does not perform the tracking area update.

In conjunction with the move, the user apparatus performs the cell re-selection, but does not perform the tracking area update as long as the tracking area visited is the same.

Moreover, a user apparatus in an active mode, i.e., a user apparatus in communication, does not have to perform the tracking area update.

SUMMARY OF THE INVENTION

Problem(s) to be Solved by the Invention

A user apparatus in an idle mode monitors a paging channel at a discontinuous reception (DRX) timing, and checks whether there is a physical downlink control channel (PDCCH) intended for a paging-radio network temporary identity (P-RNTI) that corresponds to an own user apparatus. If affirmative, a physical downlink shared channel is further received, and, if there is an identifier (UE ID) for the own-user apparatus, an incoming transmission is recognized, so that the process moves to a connection procedure. A paging parameter used in receiving the paging channel is reported in the broadcast channel. The paging parameter includes at least a DRX reception period and the number of paging groups.

When the user apparatus performs a cell re-selection, and newly camps on the cell, all broadcast information sets are received, so that the paging channel cannot be received until receiving of the broadcast information is completed. In other words, if there is an incoming transmission between the time the user apparatus performs a cell re-selection to the time the broadcast information reception is completed, such incoming transmission cannot be received. Here, the broadcast information reception means a reception of all paging parameters used in receiving the paging channels.

Then, the present invention, which seeks to solve the problems as described above, aims to provide a user apparatus which makes it possible to shorten the time during which incoming transmission cannot be received when the cell re-selection is started.

Means for Solving the Problem

In order to solve the problems described above, according to the present invention there is provided a user apparatus which performs, when there is a change in a cell visited, a re-selection of a cell to camp on, including a tracking area ID determining unit which determines whether a new ID of a tracking area that is transmitted from one or more base station apparatuses matches a tracking area ID of a cell visited immediately before the cell re-selection; and a paging reception unit which conducts a paging reception using a paging parameter in the cell visited immediately before the cell re-selection when it is determined that the new ID of the tracking area matches the tracking area ID of the cell visited immediately before the cell re-selection.

According to the present invention there is provided a paging channel reception method, which method is a method of paging channel reception in a user apparatus which, when there is a change in a cell visited, performs a re-selection of a cell to camp on, including a tracking area ID determining step of determining whether a new ID of a tracking area that is transmitted from a base station apparatus matches a tracking area ID of a cell visited immediately before the cell re-selection; and a paging reception step of conducting a paging reception using a paging parameter in the cell visited immediately before the cell re-selection when it is determined that the new ID of the tracking area matches the tracking area ID of the cell visited immediately before the cell re-selection.

Advantage of the Invention

The disclosed user apparatus and paging channel reception method make it possible to shorten the time during which an incoming transmission cannot be received when the cell re-selection has started.

DESCRIPTION OF THE PREFERRED EMBODIMENTS

Description of Notations $100_n$ ($100_1$, $100_2$, $100_3$, . . . , $100_n$) user apparatus; 102 RF receiver; 104 L1/L2 processor; 106 RRC processor; 108 NAS processor; $200_1$ ($200_1$, $200_2$, $200_3$, . . . , $200_1$) base station apparatus; $202_1$ ($202_1$, $202_2$, $202_3$, . . . , $202_1$) cell; $204_m$, ($204_1$, $204_2$, $204_3$, . . . , $204_m$) tracking area; 300 access gateway apparatus; 400 core network; 1000 radio communications system

BEST MODE OF CARRYING OUT THE INVENTION

In the following, best modes for carrying out the invention are described based on the following embodiments with reference to the drawings.

Throughout the drawings for explaining the embodiments, same letters are used for those elements having the same functions, so that repetitive explanations are omitted.

Figure 1:
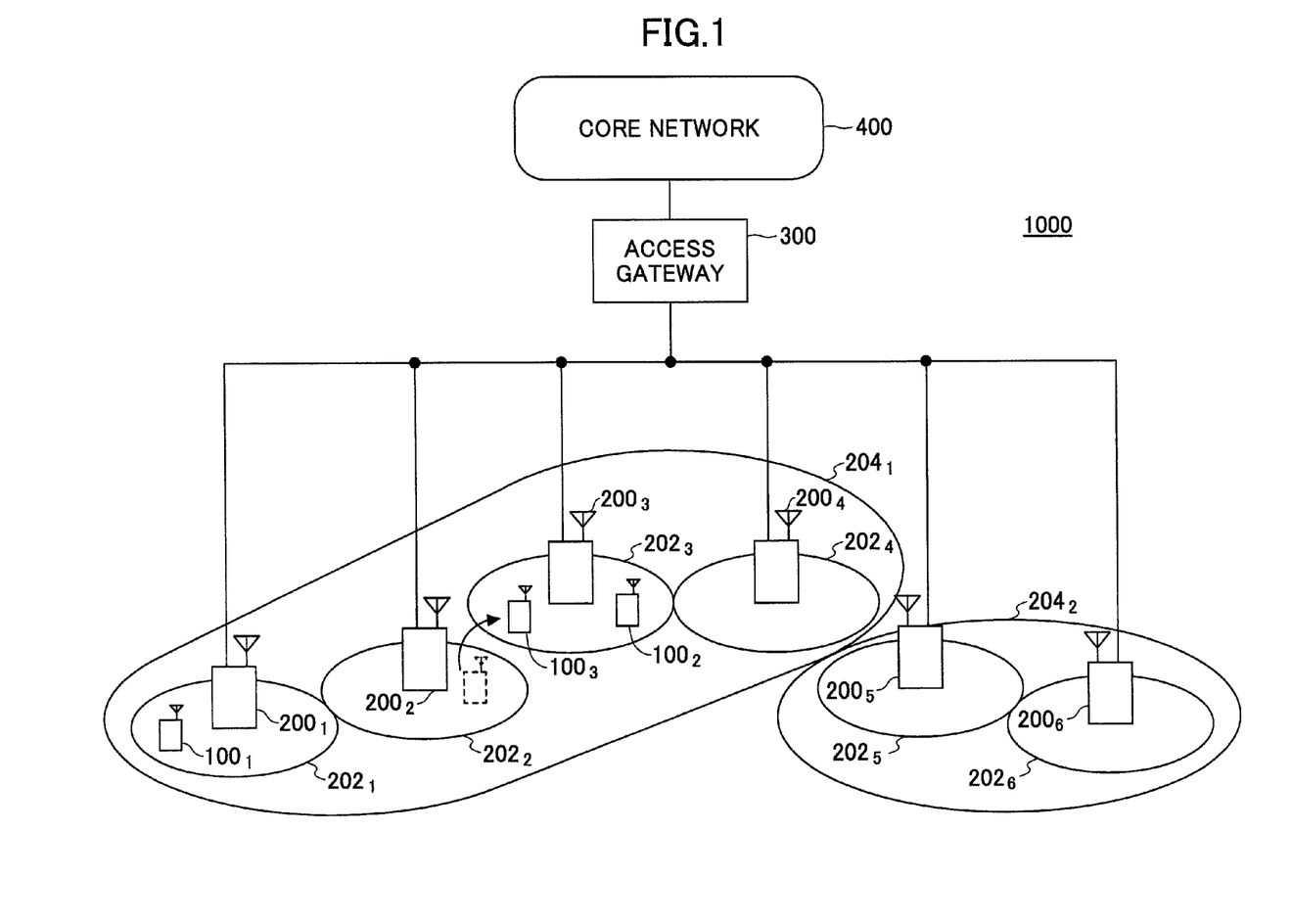
FIG. 1 is a block diagram illustrating a radio communications system according to an embodiment.

With reference to FIG. 1, an explanation is given for a radio communications system to which a user apparatus according to a present embodiment is applied. The present embodiment, which is explained with respect to a system to which a long term evolution (LTE) is applied as an example, may also be applicable to a system to which a universal mobile telephone system (UMTS) is applied, i.e., a system to which W-CDMA or HSDPA is applied.

A radio communications system 1000, which is a system to which Evolved UTRA and UTRAN (also called Long Term Evolution or Super 3G), is applied, for example, includes a base station apparatus (eNB: eNode B) 200 ($200_1$, $200_2$, $200_3$, . . . $200_1$, where 1 is an integer such that 1>0) and multiple user apparatuses (user equipment UE units) $100_n$ ($100_1$, $100_2$, $100_3$, $100_n$, where n is an integer such that n>0). The base station apparatus $200_1$ is connected to an upper-layer station apparatus (e.g., an access gateway apparatus 300), which upper-layer station apparatus 300 is connected to a core network 400. Here, the user apparatus $100_n$ communicates with the base station apparatus $200_1$ using the Evolved UTRA and UTRAN in a cell $202_1$ ($202_1$, $202_2$, $202_3$, . . . , $202_1$, where 1 is an integer such that 1>0) covered by the base station apparatus $200_1$. Moreover, one or more cells constitute a tracking area $204_m$ ($204_1$, $204_2$, $204_3$, . . . , $204_m$). For example, the cells $202_1$, $202_2$, $202_3$, and $202_4$ constitute the tracking area $204_1$, while the cells $202_5$ and $202_6$ constitute the tracking area $204_2$.

Below, the user apparatuses $100_n$ ($100_1$, $100_2$, $100_3$, . . . , $100_n$) have the same configuration, function, and status. Thus, unless otherwise indicated, they will be explained below as the user apparatus $100_n$. For convenience of explanation, what wirelessly communicates with the base station apparatus $200_1$ is a mobile station apparatus, but more generally includes a mobile terminal and a fixed terminal.

For the radio communications system 1000, OFDMA (Orthogonal Frequency Division Multiple Access) is applied for downlink and SC-FDMA (Single Carrier-Frequency Division Multiple Access) is applied for uplink as radio access schemes. The OFDMA is a scheme for dividing a frequency band into multiple narrow frequency bands (sub-carriers) and overlaying data onto the respective frequency bands for transmission. The SC-FDMA is a transmission scheme which divides a frequency bandwidth and transmits using different frequency bands among multiple terminals to make it possible to reduce interference between the terminals.

The access gateway apparatus (aGW: access gateway) 300 may be included in the core network 400 or in a network other than the core network 400. The access gateway apparatus may be divided into a control plane (C-plane) and a user plane (U-plane) or into an MME (mobility management entity)/S-GW (serving gateway). Moreover, the core network 400 includes a home location register (HLR: Home Location Register) (not shown). Moreover, an identifier of the access gateway apparatus which manages the user apparatuses $100_n$ is held in the home location register.

A radio communications system according to the present embodiment is explained.

In the radio communications system according to the present embodiment, the base station apparatuses $200_1$ which cover cells belonging to the same tracking area have the same paging parameter. In other words, the paging parameter is set for all of the base station apparatuses which belong to the tracking area. The paging parameter includes the DRX reception period and the number of paging groups for the user apparatus $100_n$ to conduct DRX reception.

In conjunction with the move, the user apparatus $100_n$ in an idle status performs a cell re-selection when there is a change in a cell visited. For example, as shown is FIG. 1, there is the change in the cell visited when the user apparatus $100_3$ moves from the cell $202_2$ to the cell $202_3$, so that it performs a cell re-selection. The user apparatus $100_n$ which performs the cell re-selection receives a broadcast channel transmitted from a newly-visited cell. The broadcast channel includes a first broadcast channel (primary broadcast channel) (P-BCH) and a dynamic broadcast channel (D-BCH). For the primary broadcast channel, a fixed transmission method is applied as for the broadcast channel in W-CDMA. In the primary broadcast channel, a minimum set of information that is to be a basis is transmitted. Information other than information transmitted by the primary broadcast channel is transmitted in the dynamic broadcast channel. The dynamic broadcast channel is transmitted in a shared data channel, for example. The dynamic broadcast channel includes one or more scheduling units (SU). For example, a first scheduling unit (SU-1) includes an ID (identifier) of a tracking area to which an own base station apparatus 200 belongs (for example, see 3GPP TS36.300, v 8.1.0, July, 2007).

Figure 2:
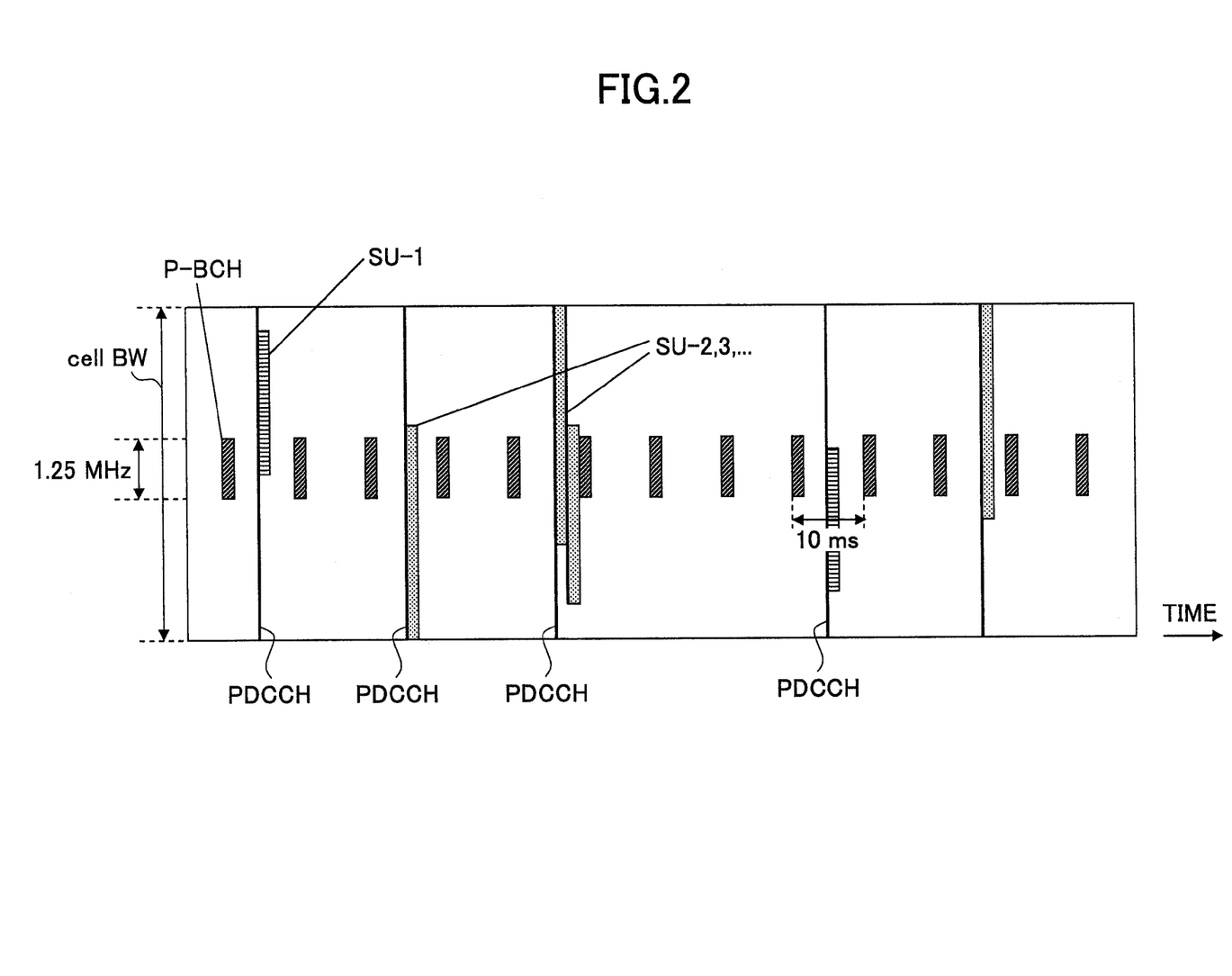
FIG. 2 is an explanatory diagram illustrating an example of a broadcast channel.

FIG. 2 shows an exemplary transmission of a broadcast channel.

The user apparatus $100_n$ which performs a cell re-selection receives a primary broadcast channel and receives a physical downlink control channel (PDCCH) specified by the primary broadcast channel. The physical downlink control channel may also be called an L1/L2 control channel. Then, it receives a first scheduling unit at a resource location specified in the physical downlink control channel, and obtains scheduling information of the following scheduling unit that is included in the first scheduling unit to receive the following scheduling unit.

When an ID of a tracking area included in the first scheduling unit is the same as an ID of a tracking area that is stored and held, the user apparatus $100_n$ starts receiving, after receiving the ID of the tracking area, a paging channel transmitted from the newly-visited cell. In this case, the user apparatus $100_n$ uses a paging parameter in a cell previously visited immediately before the cell re-selection to receive a paging channel transmitted from the newly-visited cell.

Figure 3:
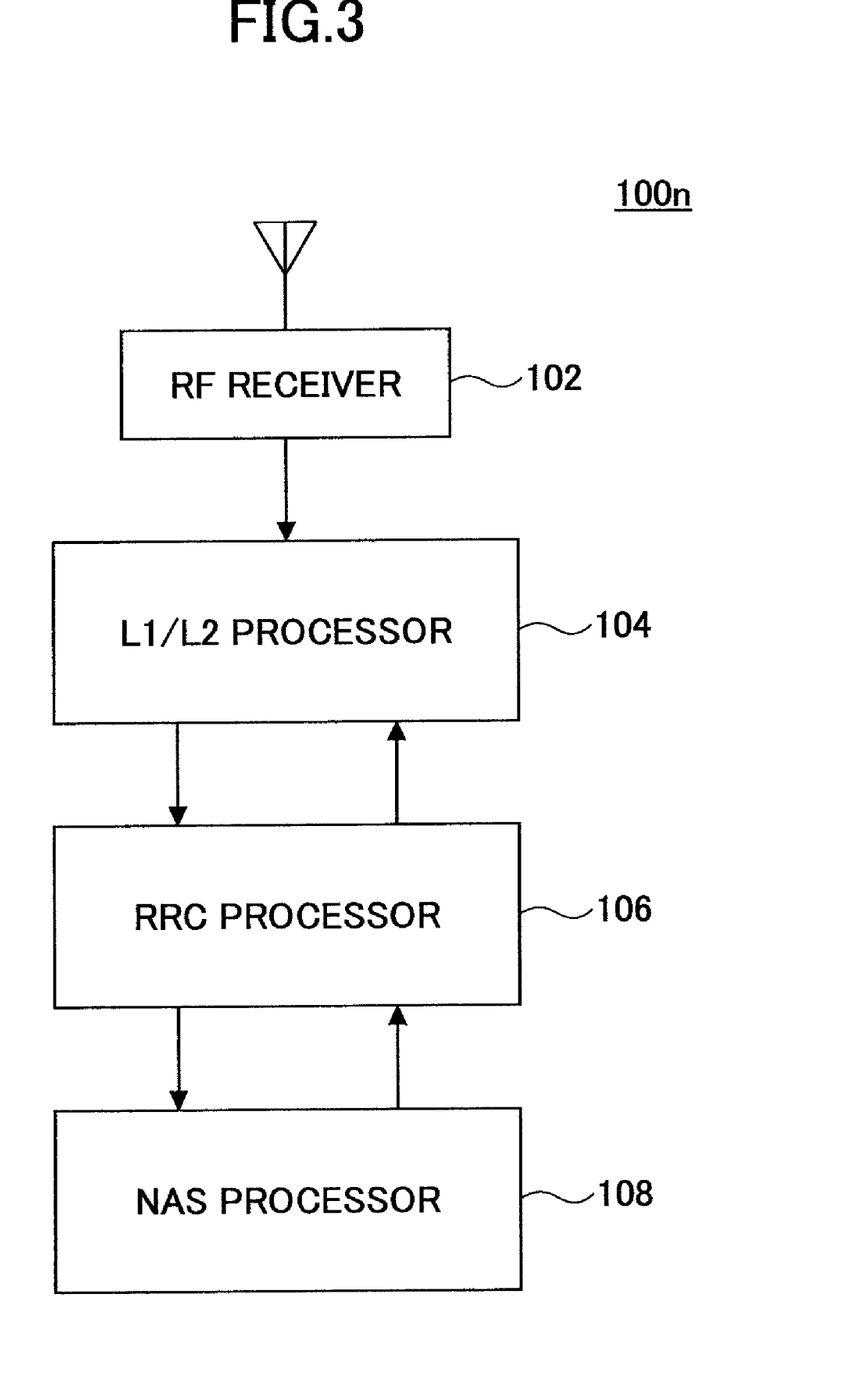
FIG. 3 is a partial block diagram illustrating a user apparatus according to an embodiment.

The user apparatus $100_n$ according to the present embodiment is explained with reference to FIG. 3.

The user apparatus according to the present embodiment includes an RF receiver 102, an L1/L2 processor 104, a RRC (radio resource control) processor 106, and a NAS (Non-Access Stream) processor 108.

When the own user apparatus $100_n$, which is in an idle status, moves such that there is a change in a cell visited and performs a cell re-selection, the RF receiver 102 receives a primary broadcast channel transmitted by the base station apparatus 200, and inputs the received broadcast channel into the L1/L2 processor 104. The primary broadcast channel is repeatedly transmitted at constant periods (for example, once every 10 ms to 20 ms). In the primary channel, transmission timing information of the physical downlink control channel that indicates where the first scheduling unit is located is transmitted in addition to Layer 1 (L1) information such as a cell bandwidth and transmission power.

The L1/L2 processor 104 receives a physical downlink control channel specified in the primary broadcast channel input by the RF receiver 102. In the physical downlink control channel, a resource unit (RU) of a corresponding scheduling unit is specified. Then, the L1/L2 processor 104 detects a location of a resource unit of the first scheduling unit specified by the L1/L2 control channel and inputs, into the RRC processor 106, the detected location of the resource unit of the first scheduling unit.

Based on the input location of the resource unit of the first scheduling unit, the RRC processor 106 receives the first scheduling unit, obtains an ID of a tracking area included in the first scheduling unit, and inputs the obtained tracking area into the NAS processor 108.

The NAS processor 108 determines whether the input ID of the tracking area matches an ID of the tracking area to which a cell visited immediately before the cell re-selection. The NAS processor 108 inputs the determined results into the RRC processor 106.

Based on the determined results input, if the ID of the newly-visited tracking area matches the ID of the previously-visited tracking area, the RRC processor 106 uses the paging parameter in the cell visited immediately before the cell re-selection to instruct the L1/L2 processor 104 to receive the paging channel. Then, the RRC processor 106 obtains scheduling information of the following scheduling unit that is included in the first scheduling unit and receives the following scheduling unit based on the scheduling information. Thereafter, the user apparatus $100_n$ changes to a camping status.

On the other hand, when the ID of the newly-visited tracking area does not match the ID of the previously-visited tracking area, the RRC processor 106 obtains scheduling information of the following scheduling unit that is included in the first scheduling unit, and receives the following scheduling unit. Then, the RRC processor 106 uses a paging parameter of the cell that is included in the following scheduling unit to instruct the L1/L2 processor 104 to receive the paging channel.

The NAS processor 108 determines whether the input ID of the tracking area to which the newly-visited cell belongs is included in an ID list of the tracking areas. When the input ID of the tracking area to which the newly-visited cell belongs is included in the ID list of the tracking areas, the NAS processor 108 inputs, to the RRC processor 106 that it is included in the ID list of the tracking areas. Thereafter, the user apparatus $100_n$ changes to a camping status.

When the input ID of the tracking area to which the newly-visited cell belongs is not included in the ID list of the tracking areas, the NAS processor 108 inputs, to the RRC processor 106 the ID that it is not included in the ID list of the tracking areas and initiates a tracking area update. The RRC processor 106 establishes an RRC connection in order to perform a tracking area update. After a new tracking area ID list is received from the network and the tracking area update is completed, the RRC processor 106 releases the RRC connection, and the user apparatus $100_n$ changes to the camping status.

Figure 4:
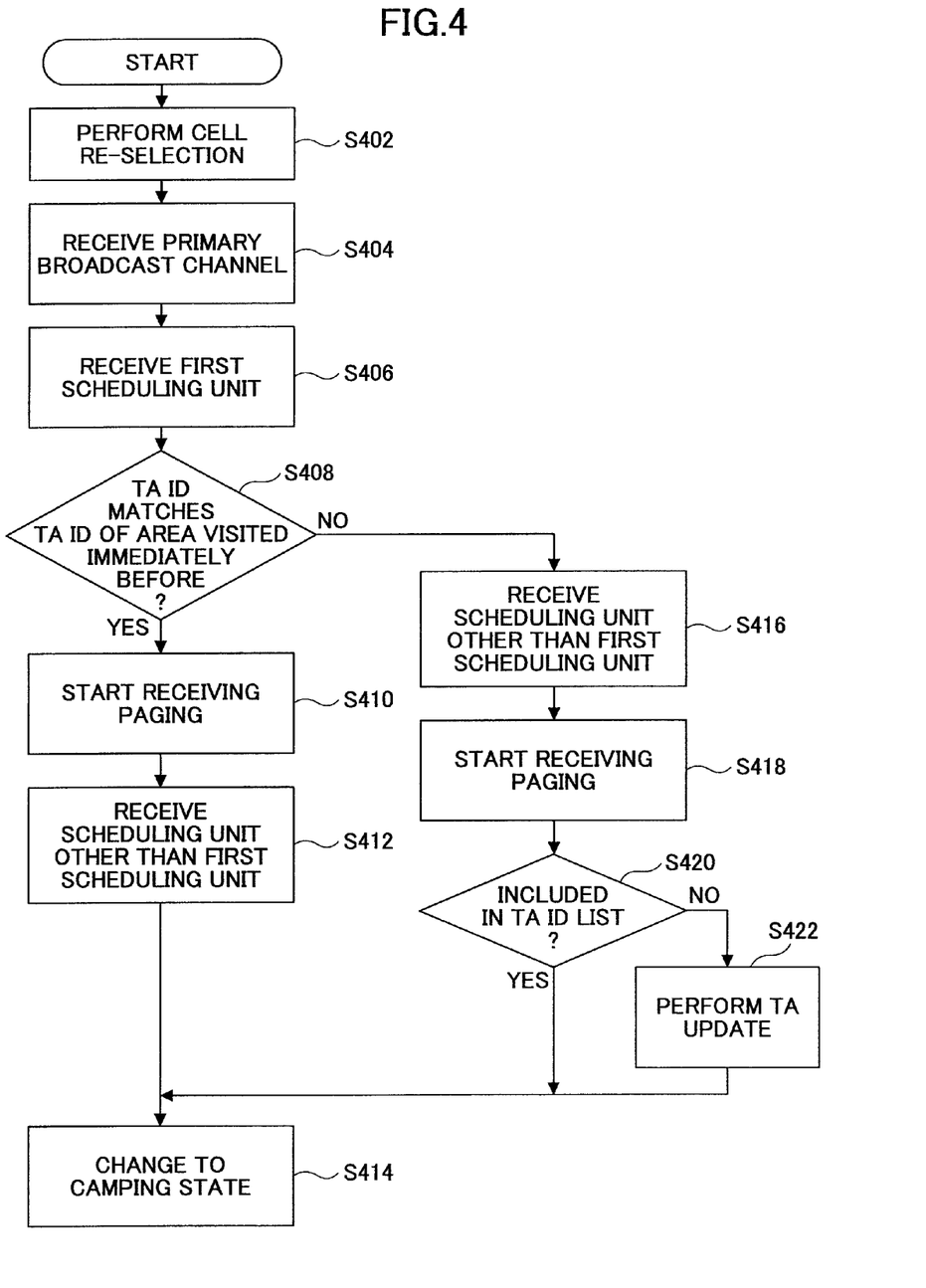
FIG. 4 is a flowchart illustrating an operation of the user apparatus according to an embodiment.

Now a paging channel reception method in the user apparatus $100_n$ according to the present embodiment is described with reference to FIG. 4.

The user apparatus $100_n$ in the idle status performs a cell re-selection when there is a change in the cell visited (step S402).

The RF receiver 102 receives a primary broadcast channel and inputs, into the L1/L4 processor 104, the received broadcast channel (step S404).

The L1/L2 processor 104 receives a physical downlink control channel specified using a primary broadcast channel, detects a location of a resource unit of a first scheduling unit that is specified in the physical downlink control channel, and inputs, into the RRC processor 106, the detected location of the resource unit of the first scheduling unit. The RRC processor 106 receives the first scheduling unit based on the input location of the resource unit of the first scheduling unit (step S406).

The RRC processor 106 obtains an ID of a tracking area included in the first scheduling unit and inputs, into the NAS processor 108, the obtained ID of the tracking area. The NAS processor 108 determines whether the input ID of the tracking area matches the ID of the tracking area to which the cell visited immediately before the cell re-selection belongs, out of IDs of the tracking areas that are stored and held (step S408).

If it is determined that it matches the ID of the tracking area to which the cell visited immediately before the cell re-selection belongs, the RRC processor 106 uses the paging parameter in the cell visited immediately before the cell re-selection to cause starting of the reception of the paging channel. As a result, the paging reception is started (step S410).

Then, the RRC processor 106 obtains scheduling information of the following scheduling unit included in the first scheduling unit and receives the following scheduling unit based on the scheduling information (step S412).

Thereafter, the user apparatus $100_n$ changes to a camping status (step S414).

On the other hand, if it is determined that it does not match the ID of the tracking area to which the cell visited immediately before the cell re-selection belongs (step S408: NO), the RRC processor 108 obtains the scheduling information of the following scheduling unit that is included in the first scheduling unit, and receives the following scheduling unit based on the scheduling information (step S416).

Then, the RRC processor 106 uses a paging parameter included in the following scheduling unit to instruct the L1/L2 processor 104 to start receiving the paging channel. As a result, the paging reception is started (step S418).

The NAS processor 108 determines whether the input ID of the tracking area to which the newly-visited cell belongs is included in an ID list of the tracking areas (step S420).

If the input ID of the tracking area to which the newly-visited cell belongs is included in the ID list of the tracking areas (step S420: YES), the NAS processor 108 reports, to the RRC processor 106, that it is included in the ID list of the tracking areas. Based on the report from the NAS processor 108, the RRC processor 106 continues to be in the DRX reception status. Namely, the paging channel is monitored at a DRX reception timing. In other words, the user apparatus $100_n$ changes to the camping status (step S414).

On the other hand, if the input ID of the new tracking area is not included in the ID list of the tracking areas (step S420: NO), the NAS processor 108 reports, to the RRC processor 106, that it is not included in the ID list of the tracking areas and initiates a tracking area update. The RRC processor 106 establishes an RRC connection based on the report by the NAS processor 108 and performs the tracking area update (step S422). After completing the tracking area update, the RRC processor 106 releases the RRC connection, and changes to a status of DRX reception of the paging channel. Namely, the paging channel is monitored at the DRX reception timing. In other words, the user apparatus $100_n$ changes to the camping status (step S414).

According to the present embodiment, the paging parameter is set to be the same within the tracking area. In this way, for performing the cell re-selection, when the ID of the tracking area that is included in the first scheduling unit matches the ID of the tracking area immediately before performing the cell re-selection, as the paging parameter in the new cell is the same as the paging parameter in the cell immediately before performing the cell re-selection, the user apparatus may start receiving the paging channel before receiving the paging parameter. In other words, the user apparatus may start receiving the paging channel immediately after receiving the first scheduling unit.

As the paging is transmitted in all cells within the tracking area, no difference occurs in the volume of traffic of paging within the same tracking area. Therefore, in the cells within the tracking area, it is not necessary to change the paging parameter (for example, the number of groups and period of the DRX reception). Specifying in advance that the paging parameter is identical within the tracking area makes it possible for the user apparatus to determine whether the paging parameter is fixed by merely checking for the matching of the tracking area ID when the cell re-selection is made. It may suffice to re-transmit the paging parameter from the broadcast channel only when the tracking area ID differs before and after the cell re-selection, so that reception of the paging channel may be started immediately without receiving the paging parameter. In this way, it is possible to reduce the probability of unexpectedly losing an incoming transmission.

In the above-described embodiment, while an example is described of a system to which Evolved UTRA and UTRAN (otherwise known as Long Term Evolution or Super 3G) are applied, the user apparatus and the radio communications system of the present invention may be applied to a radio communications system having a user apparatus which transmits information corresponding to an ID of a tracking area from a network, performs a tracking area update according to the ID of the tracking area, and further performs a cell re-selection when there is a change in a cell visited (e.g., a radio communications system to which UMTS is applied).

For convenience of explanation, specific numerical value examples are used to facilitate understanding of the present invention. However, unless otherwise specified, such numerical values are merely exemplary, so that any appropriate value may be used.

As described above, while the present invention is described with reference to specific embodiments, the embodiments are merely examples, so that a skilled person will understand variations, modifications, alternatives, replacements, etc. For convenience of explanation, while the apparatuses according to the embodiments of the present invention are explained using functional block diagrams, such apparatuses as described above may be implemented in hardware, software, or a combination thereof. The present invention is not limited to the above embodiments, so that variations, modifications, alternatives, and replacements are included in the present invention without departing from the spirit of the present invention.

The present application claims priority based on Japanese Patent Application No. 2007-255743 filed on Sep. 28, 2007 with the Japanese Patent Office, the entire contents of which are hereby incorporated herein by reference.

The invention claimed is:

1. A user apparatus which performs, when there is a change in a cell visited, a re-selection of a cell to camp on, comprising:
    a tracking area ID determining unit which determines whether a new ID of a tracking area that is transmitted from one or more base station apparatuses matches a tracking area ID of a cell visited immediately before the cell re-selection;
    a paging reception unit which conducts a paging reception using a paging parameter in the cell visited immediately before the cell re-selection when it is determined that the new ID of the tracking area matches the tracking area ID of the cell visited immediately before the cell re-selection;
    a receiving unit which receives a primary broadcast channel;
    a Layer 1/Layer 2 (L1/L2) processing unit which receives a physical downlink control channel specified using the primary broadcast channel and detects a resource location of a first scheduling unit specified in the physical downlink control channel;
    wherein the resource location provides the location of the first scheduling unit in both time and frequency; and
    a radio resource control (RRC) processing unit which, based on the resource location of the first scheduling unit, receives the first scheduling unit and obtains a tracking area ID that is included in the first scheduling unit.

2. The user apparatus as claimed in claim 1, wherein the paging parameter is set for the base station apparatuses belonging to the tracking area.

3. A method of paging channel reception in a user apparatus which, when there is a change in a cell visited, performs a re-selection of a cell to camp on, comprising:
- a tracking area ID determining step of determining whether a new ID of a tracking area that is transmitted from a base station apparatus matches a tracking area ID of a cell visited immediately before the cell re-selection; and
- a paging reception step of conducting a paging reception using a paging parameter in the cell visited immediately before the cell re-selection when it is determined that the new ID of the tracking area matches the tracking area ID of the cell visited immediately before the cell re-selection;
- a receiving step of a receiving unit receiving a primary broadcast channel;
- a resource location step of a Layer 1/Layer 2 (L1/L2) processing unit which receives a physical downlink control channel specified using the primary broadcast channel and detects a resource location of a first scheduling unit specified in the physical downlink control channel;
- wherein the resource location provides the location of the first scheduling unit in both time and frequency, and
- a processing step of a radio resource control (RRC) processing unit that receives the first scheduling unit and obtains a tracking area ID that is included in the first scheduling unit, based on the resource location of the first scheduling unit.

* * * * *